United States Patent [19]

Klein

[11] Patent Number: 5,111,659
[45] Date of Patent: May 12, 1992

[54] DEVICE FOR ADAPTING THE CHARACTERISTIC CURVE OF A HYDRAULIC ACCUMULATOR TO THE CHARACTERISTIC CURVE OF A CONSUMER

[75] Inventor: Hans-Christof Klein, Hattersheim, Fed. Rep. of Germany

[73] Assignee: Alfred Teves GmbH, Frankfurt am Main, Fed. Rep. of Germany

[21] Appl. No.: 382,797

[22] PCT Filed: Sep. 13, 1988

[86] PCT No.: PCT/EP88/00836
§ 371 Date: Jun. 15, 1989
§ 102(e) Date: Jun. 15, 1989

[87] PCT Pub. No.: WO89/03334
PCT Pub. Date: Apr. 20, 1989

[30] Foreign Application Priority Data

Oct. 17, 1987 [DE] Fed. Rep. of Germany ....... 3735236

[51] Int. Cl.⁵ .................. B60T 13/14; F16D 31/02
[52] U.S. Cl. ................................ 60/413; 60/579; 60/533; 74/110; 303/113 R
[58] Field of Search ........... 60/413, 579, 592, 547.1, 60/533; 74/110; 92/138, 140; 303/113, 114, 115

[56] References Cited

U.S. PATENT DOCUMENTS

| 1,995,507 | 3/1935 | Harry et al. | 74/110 X |
| 2,472,695 | 6/1949 | Chouings | 60/592 X |
| 3,253,518 | 5/1966 | Duemler | 92/138 X |
| 3,495,879 | 2/1970 | Sharp | 303/113 X |
| 3,889,466 | 6/1975 | Castela et al. | 92/140 X |
| 4,034,566 | 7/1977 | Suketomo et al. | 60/413 X |
| 4,697,468 | 10/1987 | Bergstrand | 92/140 X |
| 4,765,689 | 8/1988 | Rudiger et al. | 303/115 |
| 4,765,690 | 8/1988 | Rudiger et al. | 303/115 |
| 4,822,114 | 4/1989 | Klein | 303/115 |
| 4,873,902 | 10/1989 | Krieg | 30/372 |
| 4,898,433 | 2/1990 | Klein | 303/115 |

Primary Examiner—Edward K. Look
Assistant Examiner—John Ryznic
Attorney, Agent, or Firm—Robert P. Seitter; J. Gordon Lewis

[57] ABSTRACT

In order to avoid energy losses, particularly in the case of actuating operations characterized by energetic cycles, it is suggested to insert a double-lever cam-and-roller transmission mechanism between a hydraulic accumulator and a hydraulic pressure consumer which mechanism has the effect that the accumulator pressure and the consumer pressure are always balanced. The consumer is therefore actuatable by means of slight control forces, the energy used thus remaining at a minimum. Thus, only the slight actuating energy of the control forces and the unavoidable hysteresis loss of the system need to be compensated for.

6 Claims, 2 Drawing Sheets

DEVICE FOR ADAPTING THE CHARACTERISTIC CURVE OF A HYDRAULIC ACCUMULATOR TO THE CHARACTERISTIC CURVE OF A CONSUMER

This invention relates to a device for adapting the charging or discharging characteristic force curve of a hydraulic accumulator to the characteristic force-to-travel, curve of a hydraulic pressure consumer.

Today, brake systems of modern vehicles frequently have hydraulic brake boosters equipped with a pressure source consisting of an accumulator and a pump. The pump is required for charging the accumulator which may be of the piston or balloon or other suitable type. A pedal-operated brake valve is provided by means of which the pressure medium is metered from the pressure accumulator into a booster chamber. Generally, the pressure developed in the booster chamber is proportional to the brake pedal force, and displaces a booster piston acting on a master cylinder.

In order to release the brakes, the booster chamber is placed in communication with an unpressurized storage reservoir so that the pressure medium can flow out of the booster chamber. After release of the brakes, or even during braking, the accumulator is recharged, a certain amount of energy being needed to this end. Thus, during any braking action, a certain amount of energy becomes unavailable for the actuation of the booster.

In a brake-slip-controlled system, the energy loss due to accumulator recharging is particularly high. In the prior art, e.g., there are descriptions of slip-controlled brake systems in which the master brake cylinder is returned to its resting position for the purpose of pressure relief of the wheel brake cylinders. This is accomplished by reversing the booster pressure in a cyclic manner or rather in accordance with the provision of control signals generated by a brake slip control device. Any reversing of the booster pressure, however, means a loss of energy as pressure medium is taken out of the accumulator both for the return of the booster, i.e., for the pressure relief of the master brake cylinder, and for a new braking pressure build-up. Such is the case, for instance, in the brake system disclosed in German Published Patent Application (DE-OS) No. 34 44 828.

A further disadvantage of the known accumulators is that, when charged, they are necessarily under a high pressure which drops during pressure medium removal. The characteristic force curve of a hydraulic pressure consumer, however, may be just the reverse. For instance, such is the case in brake systems. As more pressure medium is metered into the hydraulic booster, the booster pressure increases. The charging capacity of the accumulator must therefore be such that, with a master brake cylinder being maximally pressurized, the almost emptied accumulator continues to make sufficient pressure available so as to enable a corresponding pressure to be generated in the master brake cylinder. The accumulator pressure when fully charged must therefore be correspondingly higher, so that charging of the accumulator must take place against high pressures. This, however, means that substantial energy is needed in order to charge the accumulator.

SUMMARY OF THE INVENTION

It is thus an object of this invention to markedly reduce the energy requirements of a hydraulic system, in particular of a brake system. Accordingly a device is suggested for adapting the characteristic charging or discharging force curve of a hydraulic accumulator to the characteristic force-to-travel characteristic curve of a consumer. The device comprises a master cylinder and piston with which the hydraulic accumulator communicates and a slave cylinder and piston with which the consumer communicates. A transmission mechanism is arranged between the pistons of the master and slave cylinders, the force transmission ratio of the transmission mechanism varying in dependence on the positions of the pistons.

Although the above device is described with reference to a brake system, it is envisioned that such a device can be used in all repeated actuating operations characterized by energy accumulation and discharge cycles.

An especially compact and advantageous embodiment of such a transmission mechanism can be realized by a double-lever cam-and-roller transmission mechanism.

All the details of such a transmission mechanism have been described in a German application P 37 18 944 filed by applicant, which application was not yet published at the filing date of the present application. The mechanism consists of two rotatably supported levers supported on each other via a roller running on cams formed on the levers' flanks. The flanks of the levers can be formed in accordance with mathematical laws. Thereby it is achieved that the roller adopts a defined position between the levers in any position of the levers. The lever ratio between the forces applied to the levers varies, depending on which position the roller adopts between the levers, so that it is possible to attain an equilibrium of the applied forces at all times.

Therefore, small additional control forces are sufficient to actuate the consumer.

This arrangement also enables the elastic energy stored in the consumer to be returned into the accumulator after the actuation of the consumer. Thus, there is an energetic interplay between consumer and accumulator so that, after an actuating operation, the accumulator need not be recharged at the expense of additional energy.

BRIEF DESCRIPTION OF THE DRAWINGS

The inventive idea will be illustrated by means of an example. For explaining this example, reference is made to the drawings wherein.

DETAILED DESCRIPTION OF A PREFERRED EMBODIMENT

Figure 1:
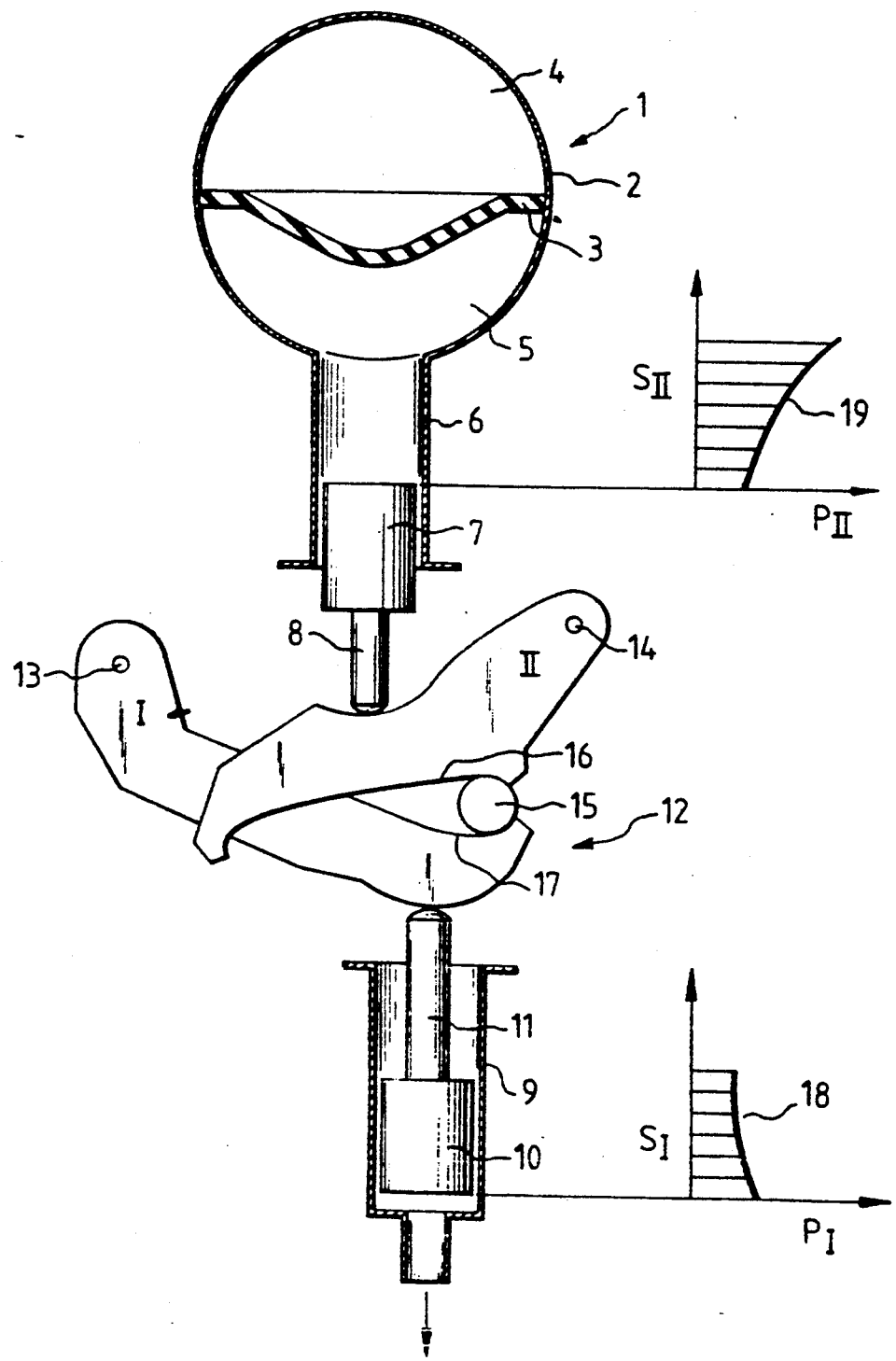
FIG. 1 is a partial cross-sectional view of a hydraulic accumulator in connection with the inventive transmission mechanism.

With reference to FIG. 1, numeral 1 indicates in general a hydraulic accumulator formed by an accumulator housing 2 and by an elastic partition wall or diaphragm 3 arranged therein. The accumulator is thus of the balloon type. The diaphragm 3 divides the accumulator housing into a gas chamber 4 and a pressure medium chamber 5. The pressure medium chamber 5 merges into a cylinder 6 confined by a piston 7.

Via a pin 8, the piston 7 acts on one side of a double-lever cam-and-roller transmission mechanism still to be described.

On the other side of the transmission mechanism 12, there is a slave cylinder 9 with a slave piston 10. Likewise via a pin 11, said slave piston 10 cooperates with the double-lever transmission mechanism 12.

The double-lever cam-and-roller transmission mechanism consists of two levers I, II rotatably supported on stationary points 13, 14. Flanks 16, 17 of the levers 13, 14 are arranged facing each other and are each supported on a roller 15. The flanks 16, 17 are designed as cam surfaces so that the position of the levers relative to their fulcrums 13, 14 will determine the position of the roller 15 relative to the flanks 16, 17. The position of the roller 15 thus determined is one in which the tangent lines at points of contact of roller 15 and flank 16, and between roller 15 and flank 17, are perpendicular to the connecting line from the points of contact through the centre point of the roller.

The pressure forces acting on the master piston 7 are applied to lever II with a constant moment arm. Likewise, the forces acting on slave piston 10 are transmitted to lever I with a constant moment arm. Since, however, the lever ratio between levers I and II changes in dependence on the position of the roller 15, the transmission ratio between the pressure forces acting on the master piston 7 and on the slave piston 10 will also change.

In FIG. 1, the hydraulic accumulator is shown in condition of a low pressure level. The gas in gas chamber 4 has a relatively large volume at its disposal so that, in accordance with the state equations of this gas, there results a low pressure. This pressure $P_{II}$ is graphically represented in the upper diagram of FIG. 1 as a function of the vertical position $S_{II}$ of the master piston 7. As the master piston being moved upwards in the drawing as per FIG. 1, the volume of the cylinder 6 and of the fluid chamber 5 remains constant since the pressure medium essentially is incompressible. The gas in gas chamber 4 is compressed whereby the pressure will increase in correspondence with the state equations of this gas. This relationship is represented by curve 19 in the upper diagram.

Conditions at the slave cylinder will be just reverse. In the illustrated position of FIG. 1, most of the pressure medium in slave cylinder 9 has been supplied to the consumer, with the consumer operating against an increasing counterforce. The pressure in the consumer cylinder, and thereby in the slave cylinder 9, is correspondingly high. As the slave piston 10 moves upwards in the drawing as per FIG. 1, pressure medium is taken out of the consumer whereby the counterforce of the element actuated becomes smaller. The pressure in the consumer will drop correspondingly. This relationship is represented by curve 18 in the lower diagram of FIG. 1, in which pressure $P_I$ is shown as a function of the vertical position $S_I$ of the slave piston 10.

The increasing pressure acting on the master piston 7 and the decreasing pressure acting on the slave piston 10 will nevertheless be balanced since the levers I, II will swing around their points of support 13, 14 and since, thus, the roller 15 will wander along the flanks 16, 17. The transmission ratio will change, and this in such a manner as to always maintain the desired equilibrium of forces.

Figure 2:
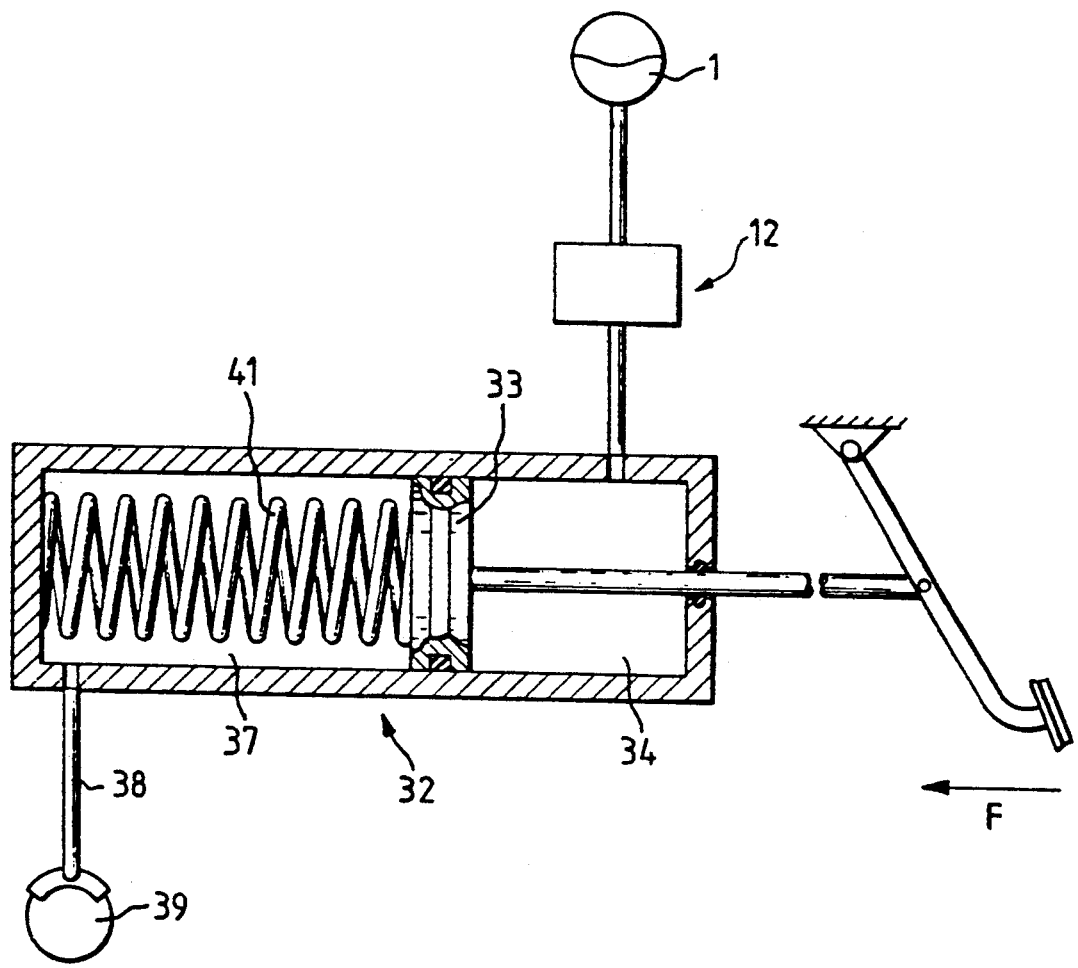
FIG. 2 is a partial schematic view of a typical hydraulic brake system incorporating the inventive device.

When regarding the primarily schematic representation of a brake system in FIG. 2, the mode of operation will become even more evident. The accumulator 1 communicates with the pressure chamber 34 via the master and slave cylinders 6, 9 and the roller-and-lever-type transmission mechanism 12. The pressure in pressure chamber 34 acts on a working piston 33 which, when pressurized, is displaced to the left in accordance with the representation of FIG. 2 and compresses the pressure medium in working chamber 37. The pressure building up there is supplied to a wheel brake cylinder 39 via the brake line 38.

As the brake system is pressurized, i.e., as pressure is built up in the wheel brakes 39, there is a simultaneous accumulation of energy. Ultimately, it is possible to think of the system consisting of the braking pressure generator 32, brake line 38, and wheel brake cylinder 39 as an elastic system, since an elastic resetting force is formed due to the expansion of the braking pressure generator housing, the brake line 38 and of the brake caliper. The resetting force ultimately determines the pressure in the braking pressure generator 32. The more the piston 33 shown in the FIG. 2 is displaced to the left, i.e., the greater the increase in volume of chamber 34 (which represents the consumer in the sense of the preceding description of FIG. 1) the greater the resetting forces become. Since, however, the pressure forces acting on the transmission mechanism are always balanced, it is possible in principle to displace the piston 33 without any force. In other words, energy is accumulated either in the accumulator 1 or in the brake system. Therefore, a small control force F is sufficient in order to displace the piston in the desired direction. The control forces can be made available in various ways which are not described in more detail here as they are outside the scope of this invention. However, the use of energy is indeed small as the control forces are small.

This will be felt especially when the pressure in the master brake cylinder is cyclically built up and decreased for the purpose of braking pressure control for slip control. The control forces will then also have to be cyclically built up and decreased. Apart from the use of energy for the control forces, only the unavoidable hysteresis losses need to be compensated for.

Finally, it should be pointed out that the use of a transmission mechanism as per FIG. 1 is of interest not only in such cyclic operations. For instance, high energy losses occur in boosters controlled by means of pedal-operated valves since pressure medium flows through the valves with high pressure differences prevailing between the accumulator pressure on the one hand and the booster pressure on the other, which booster pressure is very small at least in the initial phase. Such a high pressure difference necessarily implies high throttling losses. However, if the valve is not connected directly to the accumulator cylinder but rather to a slave cylinder 9 via transmission mechanism as per FIG. 1, then the transmission mechanism can be adjusted so that the pressure in the slave cylinder 9 will be only slightly above the pressure in the booster chamber, thereby keeping the throttling losses small.

I claim:

1. A device for modifying the pressure characteristics of an accumulator in combination with a master cylinder of an automotive hydraulic brake system including a brake pedal for operating said master cylinder, said accumulator having an expandable fluid chamber having a volume of fluid therein, accumulating the same under pressure, said device including a first cylinder and a first piston slidable therein, a first cylinder fluid space on one side of said first piston subjected to the pressure of said fluid in said accumulator expansible fluid chamber, a second cylinder having a second piston slidable therein, mechanical transmission means drivingly connecting the other side of said first piston to one side of said second piston, said mechanical transmission means including variable ratio means providing a variable ratio mechanical advantage between said first and second pistons increasing over the course of movement of said first piston in said first cylinder as said fluid chamber expands;

said second cylinder including a driver fluid space on the other side of said second piston containing a volume of fluid delivered to said fluid pressure operated mechanism by movement of said second piston in the direction of said other side thereof, said fluid space in fluid communication with said fluid pressure operated mechanism;

said brake system master cylinder requiring a predetermined pressure to be operated, and said pressure in said accumulator expandable fluid chamber at a level producing a maximum fluid pressure developed in said driver fluid space lower than that predetermined pressure required to operate said brake system master cylinder; and said brake pedal comprising means for applying a force to selectively increase the fluid pressure at said master cylinder over said maximum fluid pressure delivered from said second cylinder to enable operation of said master cylinder by means of fluid pressure generated by the combination of said accumulator and said brake pedal, whereby providing a booster for said brake pedal operation of said master cylinder.

2. A device as claimed in claim 1 wherein said mechanical transmission means includes means balancing the forces transmitted by said first and second pistons onto the mechanical transmission means in each displaced position of said pistons whereby said master cylinder can be operated by a small additional force.

3. A device as claimed in claim 2, wherein said mechanical transmission means comprises a double-lever cam and roller mechanism.

4. A device as claimed in claim 3, wherein said double lever cam and roller mechanism includes two levers rotatably supported on points of support, and an interposed roller engaging lever.

5. A device as claimed in claim 4, wherein each of said levers have a respective side facing each other and said roller, of a concave shape, with said concave sides being such as to ensure that said roller moves to a defined position in any position of the lever, said position varying the mechanical advantage exerted by one lever on the other.

6. The device according to claim 1 wherein the mechanical advantage generated by said variable ratio means causes an increase in pressure delivered to said master cylinder as said second piston is advanced by said first piston and said mechanical transmission means.

* * * * *